CONDENSER

Filed Sept. 20, 1950 2 Sheets-Sheet 1

Inventor
Jerome D Heibel
By
Ralph Hammar
Attorney

Feb. 22, 1955 J. D. HEIBEL 2,702,878

CONDENSER

Filed Sept. 20, 1950 2 Sheets-Sheet 2

Inventor

Jerome D. Heibel

By Ralph Hammar

Attorney

United States Patent Office 2,702,878

Patented Feb. 22, 1955

2,702,878

CONDENSER

Jerome D. Heibel, Erie, Pa., assignor to Erie Resistor Corporation, Erie, Pa., a corporation of Pennsylvania Application September 20, 1950, Serial No. 185,730

12 Claims. (Cl. 317—242)

In by-pass condensers such as used in radio and television chassis and the like, it is desirable that the condenser have a metal shell for mounting in a hole in the chassis and that the electrical connections to the condenser have a minimum of inductance. It is also important that the condenser have a minimum of projection above the chassis. This invention is intended to accomplish the foregoing. Further objects and advantages appear in the specification and claims.

Figure 1:
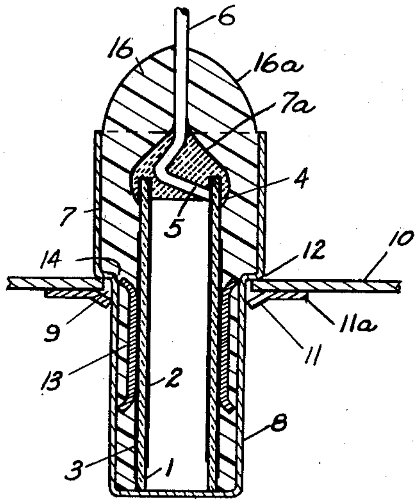
Figure 2:
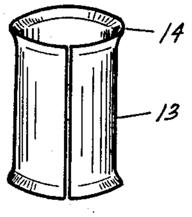
Figures 3, 5:
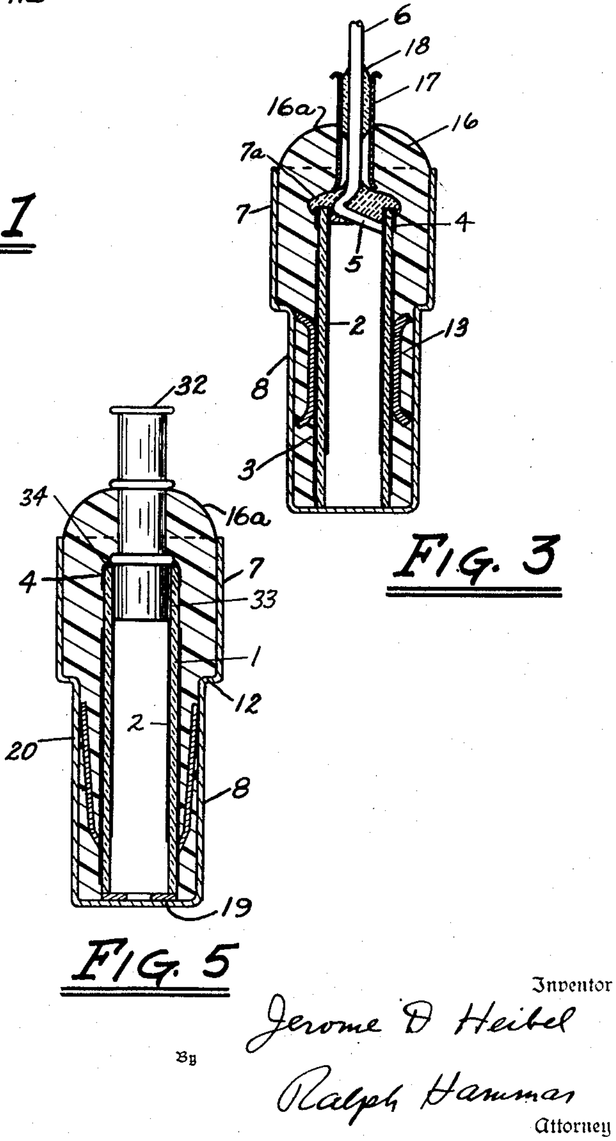
Figure 4:
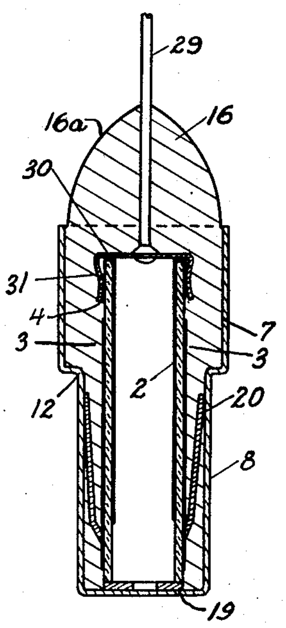
Figure 6:
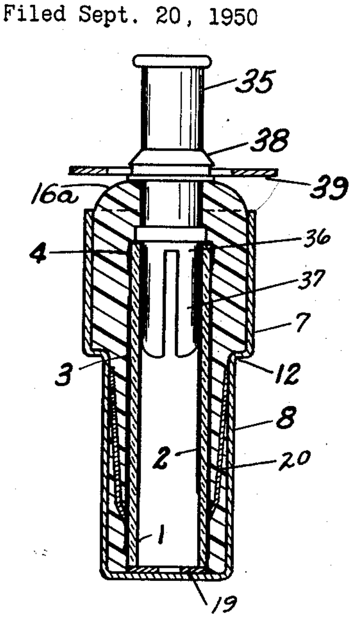
Figure 7:
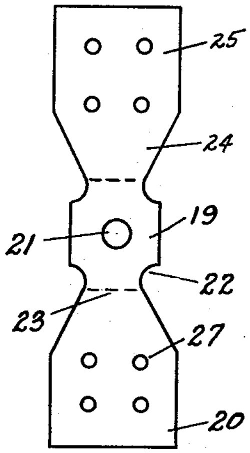
Figure 8:
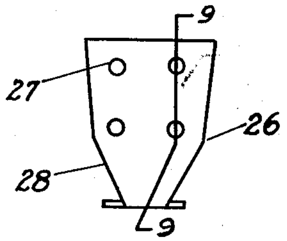
Figure 9:
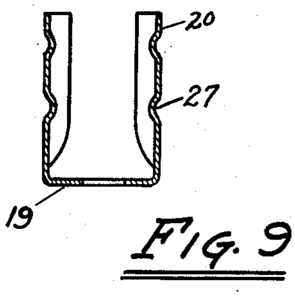
Figure 10:
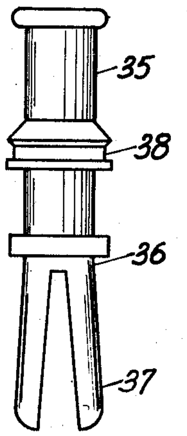

In the accompanying drawings, Fig. 1 is a section through the condenser, Fig. 2 is a perspective of the clip used in Fig. 1 condenser, Fig. 3 is a section through the Fig. 1 condenser with a modification of the terminal construction, Fig. 4 is a section through a condenser having different clip construction, Fig. 5 is a section through another condenser having the clip construction of Fig. 4 and a terminal of the post type, Fig. 6 is a section through a condenser similar to Fig. 5 having a different terminal post, Fig. 7 is a developed view of the clip used in Figs. 4, 5 and 6, Fig. 8 is a side elevation of the clip, Fig. 9 is a section on line 9—9 of Fig. 8, and Fig. 10 is a view of the terminal post used in Fig. 6.

Referring to the drawings, in Fig. 1 there is shown a tubular condenser such as more fully described in Patent No. 2,673,972. This condenser comprises a tubular dielectric 1 of ceramic or the like having inner and outer metalized coatings 2 and 3 which are usually silver bonded to the ceramic by a suitable flux. The ceramic, like other solid refractory dielectric materials, is fragile and liable to break in thin formations commonly used for condensers. The inner metalized coating 2 overlaps the upper end of the outer surface of the dielectric at 4. Wedged across the bore of the tube at the upper end is an angular extension 5 of a lead wire 6. The lead wire is soldered to the inner coating 2 and the extension 4 of the inner coating by a diaphragm 7 of solder which bridges the space between the extension 5 and the inner bore of the tube. The condenser is within a cup-shaped metal shell 7 having a reduced bottom portion 8 which in the mounted position projects through a hole 9 in a chassis 10, and is suitably held therein for example by the tangs 11 of a speed clip 11a. From one aspect the shell 7 has a wider cylindrical section adjacent its upper end or mouth. When mounted on the chassis, the shell 7 makes good electrical contact with the chassis at the shoulder 12. When so mounted the condenser functions as a by-pass condenser, by-passing the portion of the electrical circuit connected to the lead wire 6 to the chassis 10 which is customarily connected to ground. In this use, it is important that the inductance on the leads to the condenser be kept to a minimum. This object is attained by a split cylindrical metal clip 13 which is pressed into the cup 7. The clip 13 has flanges 14 which grip or engage the inner surface of the cup 7. The bore of the clip is slightly larger than the outside diameter of the outer metalized coating 3. The clip 13 is pressed into the shell 7 and then the condenser is pushed into the clip which makes a friction or pressure contact to the outer metalized electrode 3. This keeps the lead to the outer metalized electrode 3 to a minimum length and thereby minimizes the lead inductance. After the assembly of the condenser and clip into the shell 7, the interior of the shell is filled with plastic 16, which may either be a casting resin poured in place or may be molded in place by one of the molding techniques, for example, by transfer molding. The plastic 16 maintains the friction or pressure contact between the clip 13 and the outer metalized coating or electrode 3. The plastic has a convex projection 16a projecting above and extending across the mouth of the cup member or shell 7 through which the lead wire 6 extends which assists in supporting the lead.

The condenser shown in Fig. 3 is of the same construction as that shown in Fig. 1 except that a ferrule 17 is placed around the lead wire 6 and has its upper end secured thereto by solder 18. The lower end of the ferrule 17 is embedded in the plastic 16. With this construction, the lead or terminal connected to the inner metalized coating or electrode 2 is in the nature of a post, which can be used as a tie-point for connection to the electric circuit.

In Figs. 4, 5 and 6 are shown modifications which differ from the previously described constructions by the use of the clip shown in Figs. 7, 8 and 9 in place of the clip shown in Fig. 2 and in certain other respects.

The clip shown in Figs. 7, 8 and 9 is of a generally U shaped section having a flat base 19 and upstanding wings or sides 20 which are somewhat concave. The clip is made from a metal stamping having the shape shown in Fig. 7. The base 19 has a center hole 21 which facilitates the obtaining of a flat surface for the base during the forming operations. On opposite sides of the base, are the sides or wings 20 which are connected to the base by fillets 22. The sides or wings 20 are bent along fold lines 23 at the point of minimum width at the base of the fillets 22. As shown in Fig. 7, the sections of the blank which are to form the wings 20 flare outward from the fold lines 23 in gradually tapered sections 24 and terminate in sections 25 of constant width. In the forming operation, the wings 20 are both bent upward and formed concave toward each other, the sections being more sharply concave toward the fold lines 23 than at the top of the wing sections so that the projected width of the wing sections as shown in Fig. 8 appears to taper from the top toward the upper end 26 of the tapered sections 24. The projected width of the wings at point 26 is greater than the inside diameter of the reduced portions 8 of the cup-shaped shells 7. Above the point 26, the wings have inwardly extending dimples 27 which assist in making electrical contact with the outer electrode 3.

In the use of the clip, the tubular condenser is placed between the wings 20 with its bottom resting on the upper surface of the base 19 and the clip with the condenser assembled therein is then inserted into the open end of the cup shell 7 and the assembly pressed into the shell. At the start of the assembly into the shell, the shoulder 12 on the shell engages the tapered section 24 of the clip at approximately the point indicated by the reference numeral 28. As the condenser and clip are pushed into the shell, the edges of the wings are forced together, making the wings more concave and in effect wrapping or partly wrapping the wings around the condenser. The result is that the outer electrode coating of the condenser is tightly gripped between the wings 20 of the clip and the wings have firm contact with the shell. The dimples 27 assist in providing a good mechanical and electrical contact. After the assembly is pushed into the shell 8, the condenser is securely held therein and is also centered with respect to the inside diameter of the reduced section 8.

The condensers shown in Figs. 4, 5 and 6 all use the clip shown in Figs. 7, 8 and 9. Each of the condensers, however, differs in the structure of the terminal or lead connected to the inner condenser electrode coating 2. In Fig. 4, there is a lead wire 29 riveted to a cup 30 having spring fingers 31 compressed around the outer extension 4 of the inner electrode coating 2. This is one of the common condenser terminal constructions. This condenser has the interior of the shell filled with plastic 16 as in the previously described construction, so that after the plastic is in place, the contacts to the inner and outer condenser electrodes are sealed in. In the Fig. 5 construction, there is a post 32 having its inner end 33 received within the bore of the dielectric 1 and connected to the inner electrode coating 2 by solder 34. In Fig. 6 there is also a post terminal 35 having an inner end 36 provided with diverging spring fingers 37, which when received within the bore of the dielectric make frictional electrical contact with the inner electrode coating 2. The terminal 35 is also provided with a grooved flange 38 in which is snapped a washer 39 of insulating material. The terminal 35 is shown in greater detail in Fig. 10.

What I claim as new is:

1. In combination, a cup shaped metal shell for mounting in a hole in a radio chassis or the like and serving as a terminal connection to the chassis, a U shaped clip having a base towards the bottom of the shell and concave sides or wings extending towards the top of the shell, said wings prior to insertion into the shell having a projected width greater than the chord of the shell engaged by the edges of the wings whereby the edges of the wings are bent more concave toward each other as the clip is inserted, a condenser having a tubular dielectric with its lower end resting on the base of the clip and its outer side frictionally gripped between the wings of the clip, inner and outer electrode coatings on the dielectric, the outer coating being in engagement with the wings, and a terminal at the top of the dielectric having a shoulder engaging the upper edge thereof and having spring fingers extending within the bore of the dielectric into contact with the inner electrode coating.

2. In combination, a cup shaped metal shell for mounting in a hole in a radio chassis or the like and serving as a terminal connection to the chassis, a U shaped clip having a base toward the bottom of the shell and concave sides or wings extending toward the top of the shell, said wings being of less projected width adjacent the base of the clip and of increasing projected width toward the top, the widest portions of the wings prior to insertion into the shell having a projected width greater than the chord of the shell engaged by the edges of the wings whereby the edges of the wings are bent more concave toward each other as the clip is inserted, a condenser having a tubular dielectric with its lower end resting on the base of the clip and its outer side frictionally gripped between the wings of the clip, inner and outer electrode coatings on the dielectric, the outer coating being in engagement with the wings, and a terminal at the top of the dielectric in contact with the inner electrode coating.

3. In combination, a cup shaped metal shell for mounting in a hole in a radio chassis or the like and serving as a terminal connection to the chassis, a U shaped clip having a base toward the bottom of the shell and concave sides or wings extending toward the top of the shell, said wings being more sharply concave toward the base and increasing in projected width toward the top, the widest portions of the wings prior to insertion into the shell having a projected width greater than the chord of the shell engaged by the edges of the wings whereby the edges of the wings are bent more concave toward each other as the clip is inserted, a condenser having a tubular dielectric with its lower end resting on the base of the clip and its outer side frictionally gripped between the wings of the clip, inner and outer electrode coatings on the dielectric, the outer coating being in engagement with the wings, and a terminal at the top of the dielectric in contact with the inner electrode coating.

4. In combination, a cup shaped metal shell for mounting in a hole in a radio chassis or the like and having an enlarged upper end providing a shoulder for engagement with the surface of the chassis around the hole, a U shaped clip having a base toward the bottom of the shell and concave sides or wings extending toward the top of the shell, said wings prior to insertion into the shell having a projected width greater than the chord of the shell engaged by the edges of the wings whereby the edges of the wings are bent more concave toward each other as the clip is inserted, a condenser having a tubular dielectric with its lower end resting on the base of the clip and its outer side frictionally gripped between the wings of the clip, inner and outer electrode coatings on the dielectric, the outer coating being in engagement with the wings, and a terminal at the top of the dielectric connected to the inner coating.

5. In combination a metal shell, a U-shaped metal clip having a base toward one end of the shell and sides or wings extending toward the other end of the shell, said wings engaging the shell when inserted therein, a condenser having a dielectric with one end seated on the base of the clip and gripped between the wings of the clip, and a condenser electrode coating on the dielectric in contact engagement with at least one of the wings.

6. In combination a shell, a U-shaped metal clip having a base toward one end of the shell and sides or wings extending toward the other end of the shell, said wings engaging the shell when inserted therein and said base having an opening therein, a condenser having a tubular dielectric with one end seated on the base of the clip and with its outer side frictionally gripped between the wings of the clip, and a condenser electrode coating on the outer side of the dielectric in contact with at least one of the wings.

7. A capacitor, comprising a thin walled tube of dielectric material which is fragile and liable to break in thin formation, conductive electrodes on the inner and outer surfaces of said dielectric tube in capacitive relation to each other, a solid conductive metal terminal stem having a pair of contact fingers biased away from each other and an outwardly projecting collar adjacent the base of said fingers, said contact fingers being arranged in said dielectric tube and having direct frictional and electrical contact with said inner electrode, said collar abutting the end of said dielectric tube, the part of said stem protruding from said dielectric tube providing a tie post, and a conductive casing surrounding said dielectric tube in spaced relation thereto and electrically connected to said outer electrode whereby said casing serves as the terminal therefor, and a body of insulating material filling the space between said dielectric tube and also covering said collar.

8. A capacitor comprising a thin walled tube of dielectric material which is fragile and liable to break in thin formation, conductive electrodes on the inner and outer surfaces of said dielectric tube in capacitive relation to each other, a body of insulating material surrounding and embedding said dielectric tube, a conductive terminal member connected to said inner electrode at one end of said dielectric tube, a conductive casing surrounding said body of insulating material and a generally U-shaped conductive contact member embracing the other end of said dielectric tube and contacting said outer electrode and the side wall of said casing and embedded in said body of insulating material whereby said casing serves as the terminal for said outer electrode.

9. A capacitor, comprising a thin walled tube of dielectric material which is fragile and liable to break in thin formation and open at its opposite ends, conductive electrodes on the inner and outer surfaces of said dielectric tube in capacitive relation to each other, a body of insulating material surrounding and embedding said dielectric tube, a conductive terminal member connected to said inner electrode at one end of said dielectric tube, a conductive casing surrounding said body of insulating material, and a conductive contact member embracing the other end of said dielectric tube and contacting said outer electrode and said casing and embedded in said body of insulating material whereby said casing serves as the terminal for said outer electrode, said contact member comprising a pair of wing sections arranged on opposite sides of said outer electrode and connected by a web arranged across and engaging said other end of said dielectric tube, each of said wing sections having a central portion engaging said outer electrode and its opposite edges engaging the inner surface of the side wall of said casing.

10. A capacitor, comprising a thin walled tube of dielectric material which is fragile and liable to break in thin formation, conductive electrodes on the inner and outer surfaces of said dielectric tube in capacitive relation to each other, a metal cup member surrounding one end portion of said dielectric tube in spaced relation thereto, a generally U-shaped contact member fitting over one end of said dielectric tube and having its side portions projecting towards the mouth of said cup member and connecting said outer electrode with the side wall of said cup member, a terminal post extending from the other end of said dielectric tube and connected with said inner electrode, and insulating material in said cup member embedding said dielectric tube and contact member.

11. A capacitor, comprising a thin walled tube of dielectric material which is fragile and liable to break in thin formation, conductive electrodes on the inner and outer surfaces of said dielectric tube in capacitive relation to each other, a metal cup member surrounding one end portion of said dielectric tube in spaced relation thereto, a contact member connecting said outer electrode with said cup member, a terminal post extending from the other end of said dielectric tube and connected with said inner electrode, and plastic material filling said cup member and embedding said dielectric tube and contact member and having a convex projection above and across the mouth of said cup member and through which said terminal post extends.

12. A capacitor, comprising a thin walled cylindrical tube of substantially solid refractory dielectric material which is fragile and liable to break in thin formation, conductive electrodes on the inner and outer cylindrical surfaces of said dielectric tube in capacitive relation to each other, a conductive cup member encasing one end of said dielectric tube and having a narrow cylindrical section generally concentric with said dielectric tube and in closely spaced relation thereto and a wider cylindrical section adjacent the mouth of said cup member, a contact member connecting said outer electrode and said narrow cylindrical section of said cup member, a terminal post extending from the other end of said dielectric tube and connected to said inner electrode, and plastic material filling said cup member and embedding said dielectric tube and contact member and having a convex projection above and across the mouth of said cup member and through which said terminal post extends.

References Cited in the file of this patent

UNITED STATES PATENTS

| | | |
|---|---|---|
| 2,129,008 | Kater | Sept. 6, 1938 |
| 2,464,377 | Cohen | Mar. 15, 1949 |
| 2,492,742 | Grasheim | Dec. 27, 1949 |

FOREIGN PATENTS

| | | |
|---|---|---|
| 590,753 | France | Mar. 25, 1925 |

OTHER REFERENCES

Harvey, abstract of application Serial Number 659,232, published April 25, 1950, 634 O. G. 311.